W. F. HAMILTON.
CORN HEADER.
APPLICATION FILED OCT. 1, 1919.

1,334,933.

Patented Mar. 23, 1920.

Inventor
William Francis Hamilton
by Nestall and Wallace
his Attorneys

UNITED STATES PATENT OFFICE.

WILLIAM FRANCIS HAMILTON, OF VENTURA, CALIFORNIA.

CORN-HEADER.

1,334,933.   Specification of Letters Patent.   Patented Mar. 23, 1920.

Application filed October 1, 1919. Serial No. 327,780.

*To all whom it may concern:*

Be it known that I, WILLIAM FRANCIS HAMILTON, a citizen of the United States, residing at Ventura, in the county of Ventura and State of California, have invented new and useful Improvements in Corn-Headers, of which the following is a specification.

This invention relates to a device for cutting off the heads of corn and like plants, and pertains particularly to cutting means in combination with means for bringing the stalks to the former in position to be severed adjacent the head. If the heads are severed with a portion of the green stalk and the severed heads placed in piles, the corn will heat and spoil.

My invention is particularly applicable to heading Kafir corn. This cereal grows with the heads at varying heights, and the heads ripen while the stalks are still green. Some of the heads due to their weight, hang over from the stalk in inverted position. It is necessary in cutting the same by machine to bring the heads to approximately the same level, hereafter called "equalizing." Due to the nature of the stalks, the latter break easily, and, if bent, do not quickly recover their former upright position. It is therefore necessary, and it is an object of my invention to provide means for positively feeding to the cutting means the corn with heads equalized.

In addition to the broader features of my invention other objects thereof are to provide details of structure, whereby stalks which are down and heads which are hanging may be lifted sufficiently to enable them to be successfully cut, and whereby plants which are bent will not pass below the cutter.

Figure 1:
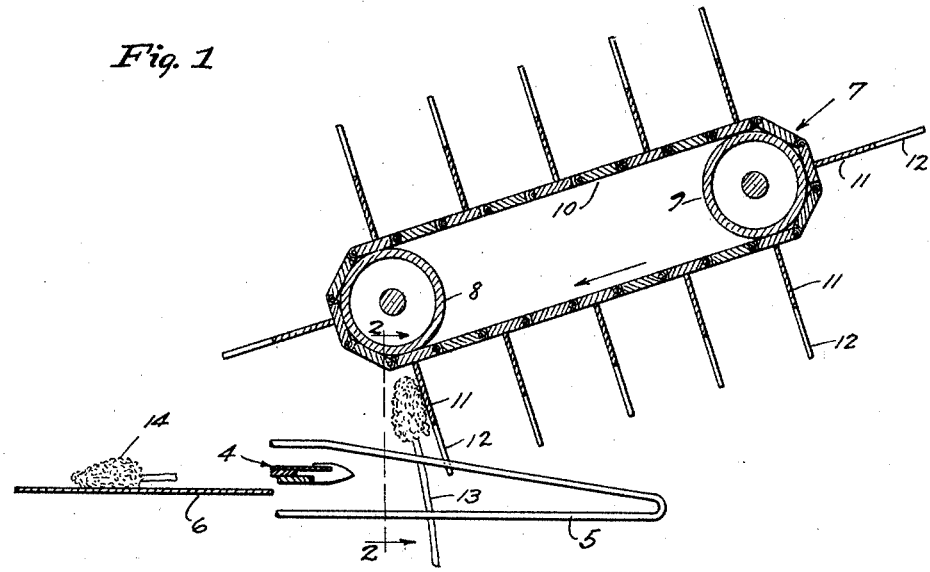
Figure 2:
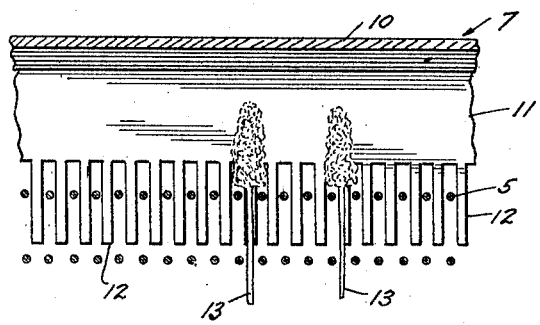
Figure 3:
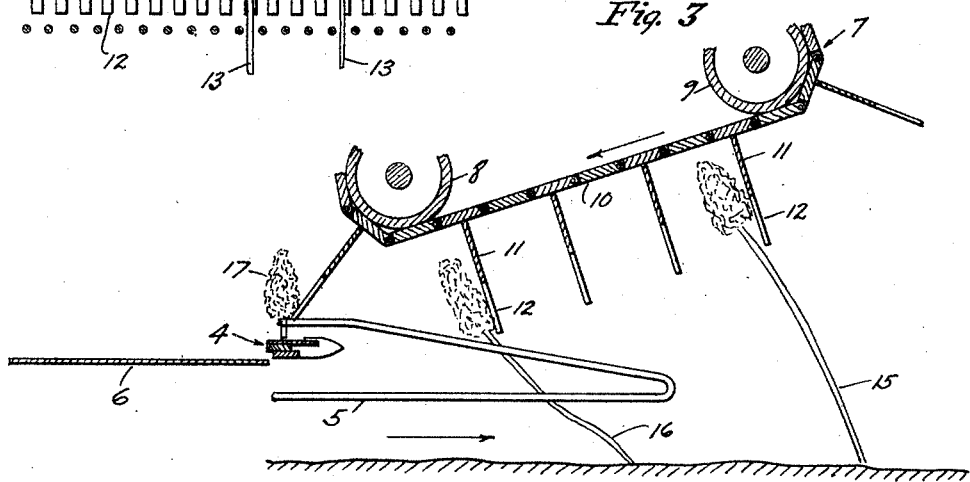

I accomplish these objects by means of the embodiment of my invention illustrated in the accompanying drawing, in which:

Figure 1 is a vertical section through the feeder, divider comb, knife bar, and cross conveyer, parts not shown being the usual reaper construction; Fig. 2 is a fragmentary section taken on the line 2—2 of Fig. 1; and Fig. 3 is a fragmentary section similar to Fig. 1 showing high stalks being bent and fed to the knife.

Referring more particularly to the drawing, 4 indicates a horizontally disposed knife bar of the oscillating type. Extending forwardly thereof is a divider comb 5 consisting of long extension teeth for lifting stalks which are down as well as heads which hang and for preventing the heads of the plants which are bent from passing below the cutting means. It also prevents heads from passing below the level of the knife. A cross conveyer is indicated by 6. In advance of the knife bar and disposed above the comb is an equalizing feeder indicated generally by 7.

The equalizing feeder is a draper comprising two rolls or wheels 8 and 9 over which is passed an endless belt 10, which is driven thereby. The draper travels at an inclination to the horizontal. The rolls may be driven by any suitable means, such as is used for driving the reels of harvesting machines. Extending from the endless belt are impellers 11. The impellers terminate in fingers 12 disposed to sweep between the divider comb and toward the knife bar, clearing the latter.

In cutting stalks whose heads are of the average height, the impeller blades engage the stalks 13 as shown in Fig. 1, and advance them between the divider or supporting comb teeth to the cutter bar, where the heads are severed. The heads are then delivered by the fingers to the cross conveyer as indicated by 14.

In the case of stalks which are high, the latter, as shown in Fig. 1, are engaged by the impellers and bent downwardly as indicated by 15 and 16 in Fig. 3. In this equalized position, they are swept toward the cutter bar, and the heads severed as indicated by 17 and delivered to the cross conveyer. It is obvious that the heads can pass no higher than the draper at its lowest point and no lower than the comb. The comb is an important element, as the heads are heavy and the stalks comparatively weak, so that if it were not for the comb supporting the heads after bending the stalks, many of the plants would sink below the cutting means.

I claim—

1. In a header, the combination of a horizontally disposed cutting machine having a supporting comb for plants, an equalizing draper disposed in advance of said cutting means with its longitudinal axis inclining downwardly from the front to the rear, and blades on said draper disposed so as to sweep plants being reaped downwardly and toward said cutting means with the heads upon said comb.

2. In a header, the combination of a horizontally disposed cutting machine, a supporting comb for plants extending forwardly thereof, an equalizing draper in advance of said cutting means with its longitudinal axis inclining downwardly from the front to the rear, and blades extending from said draper so as to sweep plants being reaped downwardly between the teeth of said comb and toward said cutting means.

3. In a header, the combination of a horizontally disposed cutting machine, a divider comb extending forwardly thereof, an equalizing draper in advance of said cutting means with its longitudinal axis inclining downwardly from front to rear, and blades extending from said draper so as to sweep plants being reaped downwardly between the teeth of said comb and toward said cutting means said blade terminating in fingers disposed to enter between the teeth of said comb.

In witness that I claim the foregoing I have hereunto subscribed my name this 23rd day of September, 1919.

WILLIAM FRANCIS HAMILTON.